June 2, 1970   HEINZ-JOACHIM MUHLBERG ET AL   3,515,611
METHOD FOR CEMENTING CHEMICALLY RESISTANT TILES
Filed Feb. 8, 1968
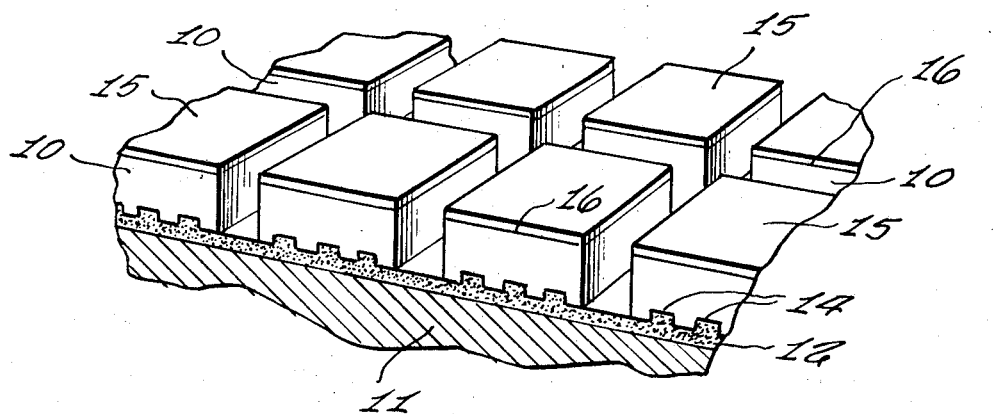
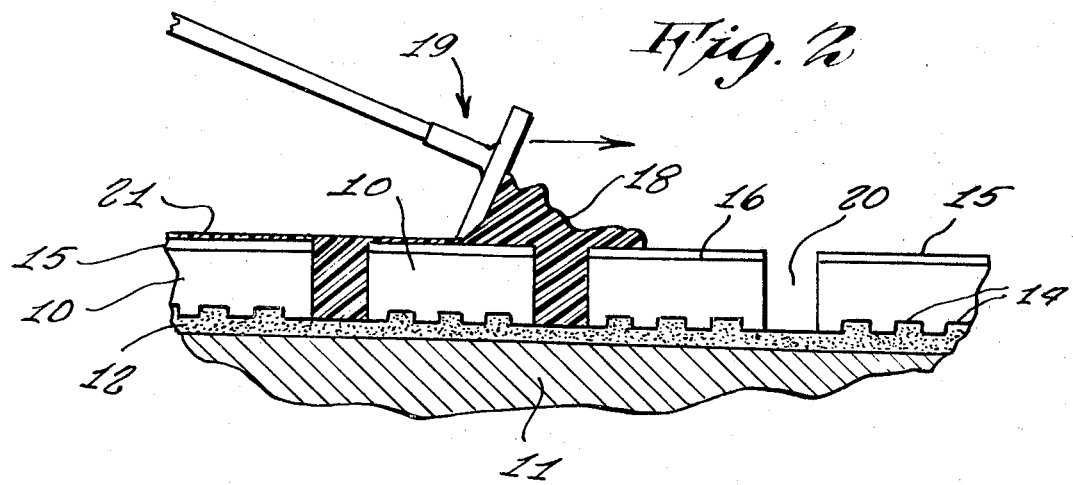
INVENTORS
HEINZ-JOACHIM MÜHLBERG,
ECKHARD SCHACHT
and
JOSEF BRACH

United States Patent Office 3,515,611
Patented June 2, 1970

3,515,611
METHOD FOR CEMENTING CHEMICALLY RESISTANT TILES
Heinz-Joachim Muhlberg, Albertstrasse, Montabaur, Germany; Eckhard Schacht, Schenkendorfplatz 11, Hohr-Grenzhausen, Germany; and Josef Brach, Burgwies 4, Herschbach-Westerwald, Germany
Filed Feb. 8, 1968, Ser. No. 704,027
Claims priority, application Germany, Feb. 9, 1967, G 49,212; Feb. 15, 1967, G 49,273
Int. Cl. E04f 13/00
U.S. Cl. 156—71　　　　　　　　　　　　6 Claims

ABSTRACT OF THE DISCLOSURE

A method for rapidly cementing a protective tile covering to a surface to form a lining which would otherwise be exposed to the action of corrosive liquids, particularly acids. Prior to setting, the outer surface of each tile is pre-coated with a protective layer. A synthetic resin cement, in slurry form, is spread over the coated surfaces of the tiles to fill the interstices of the joints where no protective pre-coating is present. The cement and the pre-coated layer interact partially to dissolve or to soften the pre-coated layer so that the protective layer and an unavoidable thin overlying layer of excess cement may be easily removed as a unit after the cement has started to cure or the curing has been completed.

---

The present invention relates to chemically resistant tile linings or coverings for surfaces such as walls, floors and the like. More particularly, the chemically resistant surface of each tile is individually pre-coated with an aqueous dispersion. The pre-coated layer serves as a protective and as a separation coat prior to and during the setting of the tiles. A slurry type cement having a synthetic organic base is used for setting the tiles. After the tiles have been set, the separation coat is removed, along with excess residual cement to expose the working surfaces of the tiles which resist the action of corrosive chemicals, such as acids. The separation coat together with a thin overlying layer of excess cement are simultaneously removed after at least partial curing of the cement.

In accordance with the invention, the dispersion which is included in the pre-coating material contains a component which avoids film formation and, additionally, by causing the pre-coating layer to be subject to softening by and/or to be slightly soluble in certain solvents contained in the cement.

There has been considerable technical development in the field of cements known as synthetic resin cements for acid proof protection work. These cements comprise organic synthetic resin solutions mixed with organic or inorganic fillers and suitable hardener systems for forming joints in acid resistant tile linings. This may be used for linings with so-called split tiles as well as with other tiles, which are applied with interstices or similar hollow joints in suitable bedding cements of various types to floor, bottom, wall or similar surfaces. The width and depth of the joints varies according to the requirements of each case and also according to the type of tile and the service conditions.

The cements, which consist of organic synthetic resins and proper fillers may be pressed into the joints by hand using a special pointing tool or by means of cement injectors using compressed air or by otherwise creating a compressive action in a suitable injector. With either method, some smudging of the tile surfaces is nearly always involved, even if the work is very carefully done.

It is possible to clean the tiles by mechanical wiping and by careful removal of the excess cement with a solvent before the cement has hardened.

According to the present state of the art, tile coverings with interstices or joints to be filled with cement mortar need not be treated as described above. The filling of the joints may be effected by applying a slurry consisting of a highly plasticized dilute cement mortar, the slurry being spread by means of a rubber scraper or squeegee which acts on a large surface. By using this method of applying cement mortar slurry, the working time necessary for filling the joints of tile linings at floors, bottom, and walls is much less than that required when using conventional synthetic resin cement. It is thus possible to apply the cement mortar slurry to a floor lining in about 34 minutes per square meter whereas approximately 1–1½ hours per square meter are necessary to fill the joints with the conventional synthetic resin cements manually, as described above. By means of cement injectors, this time may be reduced to about 20–30 minutes per square meter. Due to the necessary refilling of the cement injectors with plastic cement, and also because of the necessity of keeping the tools clean, the total labor cost including the extra work like cleaning, refilling, etc., reduces the apparent economy if cement injectors are used, so that the actual labor cost is nearly as high as for manually applying the synthetic resin cement with the conventional pointing tool.

Until now it was not yet possible to employ the usual method of applying a slurry, such as cement mortar, to joints using synthetic resin cement. Whereas cleaning of the floor tiling for the removal of the cement slurry for complete cleanliness was possible by means of materials like sawdust or certain types of sand, this method is unsuitable for tile linings joined with synthetic resin cement because the tiles are subject to contamination by sticking of the sawdust or sand and because it is not possible to clean them in the same way as may be done with floor linings treated with cement slurry. Cleaning with solvents is not possible because the cement in the joints would be adversely affected. The invention makes it possible to remove excess cured synthetic resin which would otherwise require destruction of the tiles because of the high adhesion of the cement. The working time necessary for pasting masking foils or adhesive tapes or other material on the tiles renders such a procedure uneconomical.

The invention will be more clearly understood upon reading the following specification with reference to the accompanying drawing forming a part thereof.

Referring to the drawing:

FIG. 1 is a fragmentary perspective view of a section of flooring with the tiles positioned ready to receive the synthetic resin cement.

FIG. 2 is a fragmentary view in elevation showing the tiles of FIG. 1 during the application of the synthetic resin cement in slurry form.

In the drawing, a group of individual rectangular tiles 10 is secured to a fixed supporting surface 11 by the usual mortar or other conventional cement 12. The bottom surface of each tile is provided with ridges 14 to enhance the action of the mortar or cement 12. Each tile carries a pre-coated protective layer 15 the composition of which is hereinafter described in greater detail. The protective layer 15 covers the usual glaze or similar chemically resistant layer 16 of each tile.

A mass of synthetic resin cement 18 pushed ahead of a spreader 19 to fill the interstices 20 between adjacent tiles leaving an unavoidable thin layer 21 of excess synthetic resin cement 18 covering the protective layer 15 of each tile.

Utilizing the method of the invention, it is possible to apply a slurry 18 of synthetic resin to fill the interstices 20 forming the joints between tiles and subsequently to clean the finished tile linings by removal of layer 21 after curing of the cement. Moreover, the method of the present invention involves a labor time for cementing and cleaning a tile floor of only about 5–7 man minutes per square meter. The several preferred synthetic resin cements which may be employed for the slurry 18 comprise, for example, cements based on phenol, xylenol, epoxy resin, furan resin, such as polyfuryl alcohol resin, unsaturated polyester, with or without modifications as well as mixtures of these or similar materials.

For carrying out the process of slurry application to tile linings with synthetic resin cements of the composition set forth above, the tiles 10 to be used will preferably be pre-coated before bedding by means of brushes, lambskin rolls or other suitable tools to provide the protective layer 15.

The pre-coated layer 15 is composed essentially of:

| | Parts |
|---|---|
| Water | 100 |
| Polyvinyl chloride powder | 50 |
| 50% aqueous dispersion of polyvinyl-propionate | 20 |
| Glycerin | 15 |

The pre-coated layer 15 loses its aqueous component within some hours when subject to the ambient temperature, becomes dry and then closely adheres to the outer surfaces of the tiles to be protected. Before application of the synthetic resin cement 18, which will preferably be effected by initially pushing the cement out of the vessel, the pre-coated layer can not be easily stripped off nor will it be damaged by mechanical action such as walking on the tiles 10. The synthetic resin cement slurry 18 will then be distributed by means of suitable spreaders which are provided with rubber blades. During this spreading, as by the spreader, the pre-coated layer resists against peeling as well as against a diffusion of the liquid synthetic resin ingredients of the synthetic resin cement 18. It is thus possible to minimize losses of valuable synthetic resin components during the application to the tiles 10 because only a very thin film 21 of exces synthetic resin remains after the tile lining has been treated with the spreader 19.

During a period beginning shortly after the curing process has started and extending over a rather long time after curing has been completed, the precoated layer 15 together with the remaining film 21 of excess synthetic resin cement can easily be removed by means of a flexible steel scraper (not shown), since the excess synthetic resin cement 21 has combined with the painted coat 15 during the curing process. The entire covering consisting of the remaining synthetic resin film in combination with the pre-coated layer no longer adheres to the sub-surface 16 and can easily be removed. The time necessary for removing the above-mentioned combined coat amounts to about 1–2 man-minutes per square meter of surface. This is more or less the same time as is required for the cleaning of floor linings which have been provided with conventional cement mortar slurry and are being surface-cleaned with sawdust. An interaction takes place only where the synthetic resin cement 18 and the underlying protective pre-coating 15 are in contact with each other. The cement 18 which is pressed into the interstices 20 of the joints by means of the spreader 19 remains in a completely undisturbed or normal condition, and a slight separation will be present between the cement 18 within the joints 20 and the protective coating 15 on the tile surface 16 only at those places where there is a meeting between the cement 18 and layer 15.

The inclusion of chemical agents in the precoated protective layer which retard or completely prevent the curing reaction of the synthetic resin cements in question has proved a particularly advantageous feature of the process according to the invention. In consequence, the hard synthetic resin protective film 15 is maintained in a rather elastic consistency which facilitates its removal. The synthetic resin cement 18 in the joints 20 will surprisingly not be adversely affected, but will cure completely in the usual time.

It has been ascertained that it is sufficient to add very small quantities of the chemical agents to the synthetic dispersion which forms the pre-coated protective layer 15. If, for example, the interstices 20 are filled with polyester resin cements, then the addition of only two parts to 100 parts of pre-coating material of a 5% alcoholic solution of butyl catechol provides the desired elastic consistency of the combined excess synthetic resin layer 21 and the protective layer 15.

When the cementing is done by means of epoxy resin cements, materials such as naphthalene sulphonic acid amido sulphonic acid may be used as chemical agents within the pre-coated layer for retarding or completely preventing the curing of the cement, and in case of cementing by means of phenol or furan cements, small quantities of materials like sodium compounds, soft soap or similar materials may be added.

While we have shown and described what we believe to be the best embodiments of our invention, it will be apparent to those skilled in the art that various changes and modifications may be made therein without departing from the spirit and scope of the invention as defined in the appended claims.

What is claimed is:

1. A method for cementing tiles to form a lining which is resistant to corrosive chemicals, said method comprising the steps of: pre-coating the surface of each tile which is to be exposed to said chemicals with an effectively hard protective layer; confining said layer, in each instance, to said surface to be exposed; positioning a plurality of said tiles with said pre-coated surfaces exposed to provide said lining and with interstices therebetween for forming joints in said lining, said protective layer being excluded from said interstices; applying a slurry of cement containing synthetic organic resinous material to said lining; spreading said slurry to fill said interstices, said spreading step leaving a thin layer of excess cement extending over said protective layer on each of said tiles; including in said protective layer and in said cement at least one substance causing said excess cement and said protective layer to interact and combine accompanied by a softening of said layer, whereby they become readily removable simultaneously as a unit; and simultaneously removing said combined excess cement and protective layer to expose said surfaces of said tiles for resisting said chemicals.

2. The method according to claim 1, wherein said protective layer consists essentially of 100 parts of water; 50 parts of polyvinyl chloride powder; 20 parts of a 50% aqueous dispersion of polyvinyl propionate; and 15 parts of glycerin.

3. The method according to claim 1, wherein said slurry contains a cement based on a member of the group consisting of: phenol, xylenol, epoxy resin, polyfuryl alcohol resin and unsaturated polyester.

4. The method according to claim 1, wherein said substance included in said protective layer introduces about 2 parts of a 5% alcoholic solution of butyl catechol per 100 parts of protective layer material and provides said cement with a polyester resin base.

5. The method according to claim 1, wherein said substance included in said protective layer is naphthalene sulfonic acid amido sulfonic acid and provides said cement with an epoxy resin base.

6. The method according to claim 1, wherein said substance included in said protective layer is a member of the group consisting of sodium compounds and soft soap and provides said cement with a base selected from the group consisting of phenol and furan.

(References on following page)

References Cited

UNITED STATES PATENTS

| | | | |
|---|---|---|---|
| 2,252,431 | 8/1941 | Klammt | 156—71 |
| 2,718,829 | 9/1955 | Seymour et al. | 52—390 |
| 3,030,258 | 4/1962 | Wagner | 156—71 |

CARL D. QUARFORTH, Primary Examiner

S. HELLMAN, Assistant Examiner

U.S. Cl. X.R.

52—390